W. S. HENRY.
PROTECTIVE DEVICE FOR ELECTRIC INTERLOCKING SYSTEMS.
APPLICATION FILED AUG. 19, 1915.

1,334,900.

Patented Mar. 23, 1920.

INVENTOR
William S. Henry
BY
Lyman E. Dodge
ATTORNEY

W. S. HENRY.
PROTECTIVE DEVICE FOR ELECTRIC INTERLOCKING SYSTEMS.
APPLICATION FILED AUG. 19, 1915.

1,334,900.

Patented Mar. 23, 1920.
3 SHEETS—SHEET 3.

INVENTOR
William S. Henry
BY
Lyman E. Dodge
ATTORNEY

UNITED STATES PATENT OFFICE.

WILLIAM S. HENRY, OF ROCHESTER, NEW YORK, ASSIGNOR TO GENERAL RAILWAY SIGNAL COMPANY, OF GATES, NEW YORK, A CORPORATION OF NEW YORK.

PROTECTIVE DEVICE FOR ELECTRIC INTERLOCKING SYSTEMS.

1,334,900.      Specification of Letters Patent.      Patented Mar. 23, 1920.

Application filed August 19, 1915. Serial No. 46,271.

*To all whom it may concern:*

Be it known that I, WILLIAM S. HENRY, a citizen of the United States, and a resident of the city of Rochester, in the county of Monroe and State of New York, have invented a new and useful Protective Device for Electric Interlocking Systems, of which the following is a specification.

This invention relates to electric interlocking systems for railways, and particularly to a protective device designed to prevent improper operation of the parts or functions of an electric interlocking system.

One of the principal objects of this invention is to devise a protective device suitable for the individual switches, signals or functions of an electric interlocking system, as well as for the system as a whole, or any section or sections thereof, which device will efficiently protect the function or functions under its control from improper operation, but will not effect the operation of the other functions which may be operated with safety.

A further object of the invention is to devise a protective device, which can be restored to its normal position after it has operated, but which cannot be manipulated accidentally or intentionally in a way so as to interfere with or destroy the protection given by the device.

A still further object of the invention is to devise a protective device which, when operated by an improper flow of current, cannot be restored permanently to its normal position to reëstablish a path for said improper flow of current, until the conditions causing such improper flow of current have ceased to exist.

Other objects and advantages will appear as the description of the invention progresses, and the novel features of the invention will be particularly pointed out in the appended claims.

In describing the invention in detail, reference is had to the accompanying drawing, wherein I have illustrated a preferred physical embodiment of my invention, and wherein like characters of reference designate corresponding parts throughout the several views, and in which:

Figure 1:
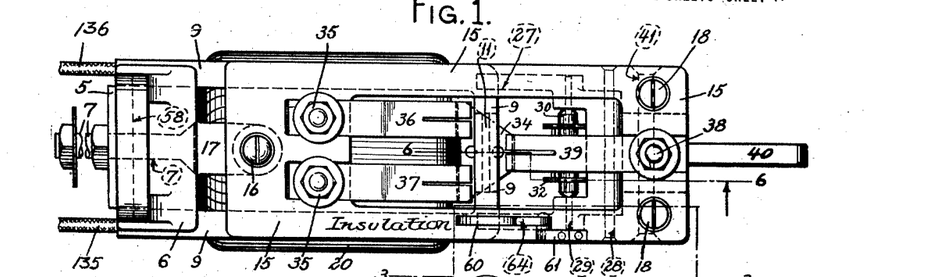
Figure 1 is a top plan view of the protective device embodying the invention, the casing for said device being removed.
Figure 3:
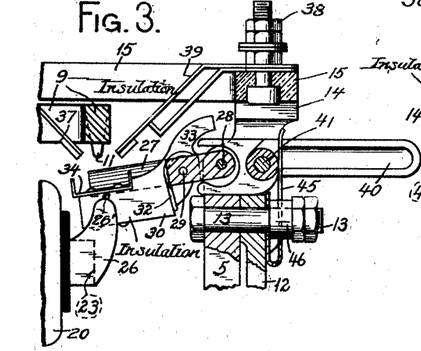
Fig. 3 is a fragmentary vertical section taken substantially on the line 3—3 in Fig. 1.
Figure 4:
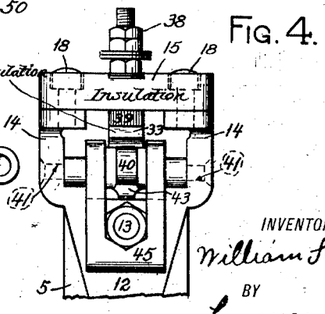
Fig. 4 is a fragmentary front end elevation of the upper portion of the device, showing, however, only those parts adjacent to the front end of the device.
Figure 5:
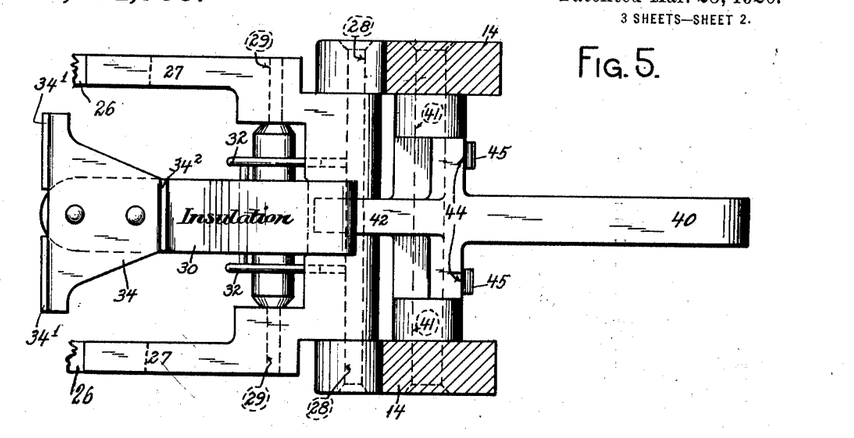
Fig. 5 is an enlarged horizontal section taken substantially on the line 5—5 in Fig. 2.

Referring to the accompanying drawings, the protective device embodying the invention is of the type commonly known as a polarized relay, and comprises a U-shaped permanent magnet 5. A soft iron supporting block 6 is fastened to one end of the permanent magnet 5 by a bolt 7, which bolt 7 is also used for clamping the whole protective device to a panel board or wall. For convenience in description the end of the protective device or relay which is secured to the board or wall will be hereinafter termed the rear end, and the opposite end will be hereinafter termed the front end. A U-shaped piece 9 of soft iron is fastened by screws 10 to the rear supporting block 6 and extends horizontally at some distance above the middle horizontal portion of the permanent magnet 5 to a point a short distance from the front end of the permanent magnet 5, said piece 9 forming an extension for the block 6. The middle portion of the front connecting portion of the soft iron piece 9 is formed with a downwardly projecting pin or rib 11 (see Figs. 1, 3 and 6), for the purpose more fully explained hereinafter. To the other end of the permanent magnet 5 is fastened by a bolt 13 another soft iron supporting block 12, said block 12 being bifurcated at its upper end to form two upstanding lugs or standards 14 (see Fig. 4). A terminal board 15 of suitable insulating material is fastened at its rear end by a screw 16 to a forwardly projecting ear or lug 17 integral with the rear supporting block 6; and said terminal board is also fastened at its front end to the standards 14 of the front supporting block 12 by two screws 18. The terminal board 15 has a rectangular central opening therein, as clearly shown in Fig. 1, the purpose of this opening being obvious as the description progresses.

The construction of the protective device so far described constitutes a skeleton or framework for supporting the operative parts, which are shown more in detail in Figs. 3 to 6 inclusive. The operating force of the protective device is derived from a coil 20 of suitable construction, which is arranged on a horizontal axis above the middle portion of the permanent magnet 5 and substantially parallel thereto, the terminal wires of said coil 20 being designated by numerals 21 and 22. The coil 20 is supported by a soft iron core 23, the rear end of which is provided with a threaded stud 24 of smaller diameter than said core 23, said stud 24 being inserted through a hole in the rear supporting block 6, and being clamped to said block by a nut 25. To the front end of the core 23 is fixed a forked pole piece 26 provided with suitable residual pins 26' of non-magnetic material according to usual practice.

The armature 27 of the protective device is U-shaped and is pivotally connected at one end to the standards 14 of the front supporting block 12 by a pin 28, the vertical planes of the sides of the limbs or side portions of said armature, the forks of the pole piece 26 and the side portion of the soft iron U-shaped extension 9 being located substantially in the same vertical planes. Pivoted to the armature 27 between the limbs thereof by a pin 29 is a contact holder 30, preferably of suitable insulating material, said contact holder 30 having a shoulder 31 (see Fig. 6) which engages a mating face on the armature 27. In this way, the shoulder 31 limits the upward movement of the contact holder 30 relatively to the armature 27; and, whereas the downward movement of the armature 27 compels the contact holder 30 to move also downwardly, the armature 27 may be moved upwardly without positively moving the contact holder 30 upwardly. A curved spring 32 is looped under the contact holder 30 and has its ends bent up and inserted in upwardly inclined bores in the armature 27, as shown to the best advantage in Fig. 6. This spring 32 serves to resiliently retain the contact holder 30 with its major portion offset from but substantially parallel with the armature 27, that is, with the shoulder 31 of said contact holder pressing against the armature.

The contact holder 30 has a forwardly and upwardly projecting curved tail 33, the function of which will be set forth fully hereinafter. To the rear end of the contact holder 30 is riveted a contact piece 34 of conducting material which has at one end two upstanding contact flanges $34^1$ and at its other end a single upstanding contact flange $34^2$. Arranged to coöperate at times with the flanges $34^1$ of the contact piece 34 are two contact springs 36 and 37, which are fastened by suitable bolts 35 to the terminal board 15, said contact springs extending forwardly and downwardly through the rectangular opening in said terminal board into position to be engaged by said flanges $34^1$ of said contact piece 34 when the contact holder 30 is in its upper position. Arranged to coöperate with the single flange $34^2$ of the contact piece 34 is a similar contact spring 39, which is fastened by a bolt 38 to the terminal board 15 and which extends rearwardly and downwardly through the rectangular opening in said terminal board into position to be engaged by said flange $34^2$ when the contact holder 30 is in its upper position.

Figures 6, 8:
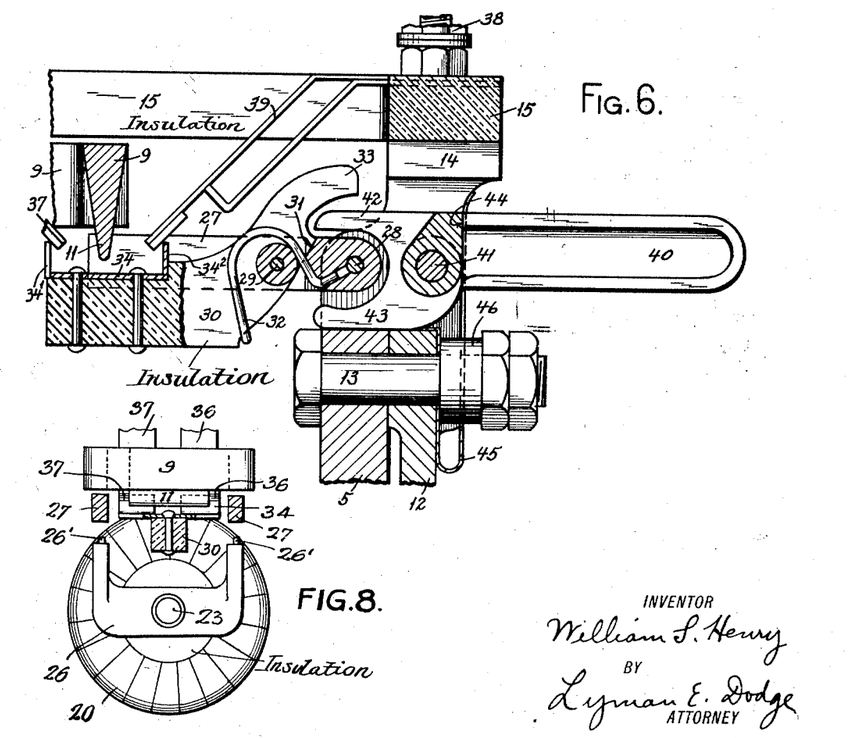
Fig. 6 is an enlarged vertical section taken substantially on the line 6—6 in Fig. 1.
Fig. 8 is a detail cross section taken substantially on the line 8—8 in Fig. 2 looking in the direction indicated by the arrows.

For restoring the armature 27 to its upper or normal position after it has been pulled down by the attraction of the coil 20, there is provided a handle 40, which is pivoted between the standards 14 of the front supporting block 12 on a pin 41, and has two forwardly projecting fingers 42 and 43 which extend respectively above and below the front cross piece of the armature 27, the upper finger 42 also underlying the tail 33 of the contact holder 30 (see Fig. 6). The handle 40 has two flat shoulders 44 against which the two side portions of a flat spring 45 press, said spring 45 being doubled under at its lower end and being clamped to the front block 12 by a washer 46 on the bolt 13.

In order to prevent unauthorized tampering with the protective device, it is preferably provided with a protecting casing 50 which is shown as constructed of a strip of sheet metal bent into a boxlike form and having a casting 52 secured in one end by rivets 51. In the end casting 52 is a slot 54 through which the handle 40 projects; and in the lower part of the end casting 52 is a hole through which a pin 55 fixed to the front supporting block 12 projects, said pin having a small hole therein which is adapted to receive a lock or a seal 56, so as to prevent the protecting casing 50 from being removed by unauthorized persons. The pin 55 supports the front end of the protecting casing 50, and the rear end of said protecting casing is supported by a downwardly bent tongue 57 which enters a horizontal groove 58 in the upper part of the rear supporting block 6, as shown to the best advantage in Fig. 2.

Since the position of the handle 40 does not indicate whether or not the armature 27 or the contact holder 30 are in their upper or lower positions, and since all of the other parts of the protective device are hidden from view by the protecting casing 50, it is desirable to provide means for indicating the position of the armature 27 and the contact holder 30. One simple way of indicating the position of the armature 27 is shown, and comprises an indicator 60 consisting of a suitably formed light piece of sheet metal, which may be distinctively colored or marked, said indicator 60 being pivoted at its lower end to a bracket 61 fastened by pins 62 or by other suitable fastenings to the terminal board 15. The indicator 60 extends upwardly through an elongated slot 63 in the protecting casing 50, and is actuated by a plunger 64 which extends downwardly through the terminal board 15 and has at its lower end an enlarged head resting upon the upper face of one limb of the armature 27. By reason of this construction, when the armature 27 is in its upper position, the indicator 60 is raised by the plunger 64 to the position shown in Fig. 2; but when the armature 27 is in its lower position, the indicator 60 drops by its own weight to a lower position in which it is partly hidden.

Figure 7:
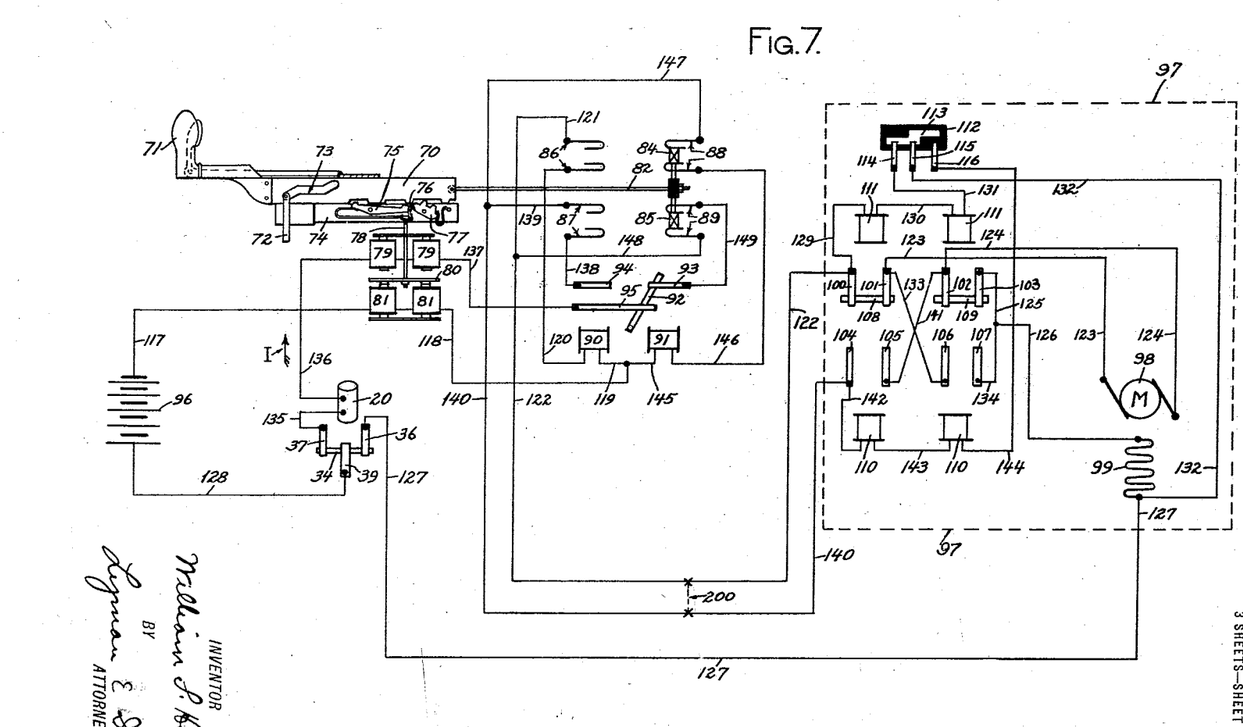
Fig. 7 is a diagrammatic illustration showing the application of the protective device embodying the invention to a system of electrical interlocking.

In Fig. 7 is shown diagrammatically an application of the protective device shown and hereinbefore described to a particular system of electric interlocking. In this particular system of electric interlocking, each switch, signal, or other part of the railway controlled by an interlocking plant, which are commonly termed functions, is controlled by a slidable bar 70, commonly termed a lever, which is provided with a suitable handle 71 for facilitating its manual operation. Only one lever 70 and its associated parts are shown in Fig. 7, but it is to be understood that there are several such levers in each interlocking plant, each lever and its associated parts constituting a unit for controlling one of the switches, signals, or other functions. These different levers 70 are arranged to be controlled by any suitable form of mechanical interlocking which is well known in the art, and this mechanical interlocking is actuated by each lever 70 by means of a link 72, the upper end of which engages a cam slot 73 in the lever 70, whereby the movement of the lever 70 causes a movement of the link 72 and its connected parts.

The lever 70 is supported by a suitable guide 74 and on this guide is pivoted a latch 75, said latch being arranged so that when one end is raised that end will coöperate with certain shoulders formed in a lower edge of the lever 70 to limit the movement of said lever in certain positions. Also pivoted to the guide 74 is a dog 76, which is arranged to catch under the adjacent end of the latch 75 and hold said latch in its upper locking position; and arranged so as to swing the dog 76 is a cam or tumbler 77 which is pivoted to the guide 74 and is provided with upstanding teeth arranged to be engaged by a tooth on the under edge of the lever 70 and to be rocked as said lever is moved back and forth. Below the dog 76 is arranged a pair of coils constituting an indication magnet 79; and below said coils is fixed another pair of coils constituting a safety magnet 81. An armature 80 is arranged to be attracted by either the indication magnet 79 or the safety magnet 81, and said armature 80 is connected to a rod 78, which extends upwardly into position to strike the dog 76 and throw it out of the position in which it holds up the adjacent end of the latch 75.

The lever 70 is arranged as a circuit controlling device, and for this purpose there is connected to the lever 70 a rod 82, to which are secured two metallic contact blocks 84 and 85 insulated from each other. Four pairs of contact springs 86, 87, 88 and 89 are arranged to coöperate with these contact blocks 84 and 85 as the lever 70 is moved back and forth.

The lever 70 has four significant positions: First, its innermost position (which is shown in Fig. 7) which position is conveniently termed the "normal" position. Second, the position in which the lever 70 is pulled to its outermost extreme, which is conveniently termed the "reverse" position. Third, a position near the inner or normal position in which the contact blocks 84 and 85 make contact with the corresponding pairs of contact springs 88 and 89, but in which the rod 72 has not been forced down by the cam slot 73 to its lowermost position, this position of the lever 70 being conveniently termed the "normal indication" position. Fourth, a position near the outer or reverse position in which the contact blocks 84 and 85 make contact with the corresponding pair of contact springs 86 and 87, but in which the rod 72 has not been raised to its uppermost position, this position of the lever 70 being conveniently termed the "reverse indication" position.

A further detail description of the construction of the parts above mentioned is not deemed necessary for a clear understanding of the operation of the protective device embodying this invention; and, if desired, a further description of the construction and operation of these parts may be had by referring to the patent to John D. Taylor, No. 752,127, and dated February 16, 1904.

Supported in any suitable way adjacent to the lever 70 is an indication selector comprising two electromagnets 90 and 91 between which a contact bar 92 is pivoted at one end so as to oscillate, said contact bar 92 being in contact with a strip 95 at all times and with strips 93 and 94 respectively in the two extremes of its movement.

Other features of the construction and operation of the indication seelector may be found in the patent to John D. Taylor, No. 832,175, dated Oct. 2, 1906.

The parts of the electric interlocking system shown in Fig. 7 so far described, are located in a tower or cabin, in which is also located a suitable source of electric current, as a battery 96; and associated with each unit lever 70 is the protective device or polarized relay shown in Figs. 1 to 6 inclusive and hereinbefore described.

The protective device is shown in Fig. 7 as applied to a part of an electric interlocking system used for operating a switch, but it is understood that the protective device is also applicable to means for operating a signal or other function.

The parts of the interlocking system which are located at the switch are shown inclosed in a dotted rectangle designated 97; and this mechanism for operating the switch comprises an electric motor M having an armature 98 and a field 99. The supply of current to the motor M is controlled by a pole-changer which comprises four pairs of contact springs 100—101, 102—103, 104—105, 106—107 and movably mounted contact blocks 108 and 109. The pole changer contact blocks 108 and 109 may be operated mechanically in correspondence with the movements of the switch or electrically by two pairs of pole-changer operating coils 110 and 111. Included in the controlling circuits for the coils 110 and 111 is a drum 112 of insulating material which has secured thereto a contact piece 113 adapted to coöperate with three contact strips 114, 115 and 116. The construction and operation of the different parts of the switch operating mechanism are fully shown and described in the patent to John D. Taylor, 800,246, September 26th, 1905.

*Operation of the interlocking system under ordinary conditions.*

In order to understand the functions performed by the protective device embodying the invention, it will be necessary to consider the operation of the system of electric interlocking shown diagrammatically in Fig. 7 under normal operating conditions, and for this purpose the operation of the different parts and the various circuits set up in moving the switch from its normal to its reverse positions, will be briefly described. When the lever 70 is pulled out and moved toward its reverse position, it may be moved without opposition to the point where the contact blocks 84 and 85 make electrical contact with the pairs of contact springs 86 and 87; but, before the full reverse position of the lever 70 is attained, the latch 75 arrests the movement of the lever 70 in its reverse indication position. When the contact block 84 is moved into contact with the contact springs 86 current will flow along a circuit which may be traced as follows:

*Circuit number one.*

From the battery 96, conductor 117, safety magnet 81, conductors 118 and 119, indication selector magnet 90, conductor 120, contact spring 86, contact block 84, contact spring 86, conductors 121 and 122, contact spring 100, contact block 108, contact spring 101, conductor 123, armature 98 of the motor, conductor 124, contact spring 102, contact block 109, contact spring 103, conductors 125 and 126, field 99 of the motor, conductor 127 to the contact spring 36 of the protective device through the contact piece 34 to the contact spring 39 and conductor 128 back to the battery 96.

The pole-changer operating coils 111 are also energized at this time according to the circuit and for the reason fully set forth in the Patent No. 800,246 hereinbefore referred to. The flow of current through the indication selector magnet 90 causes the contact bar 92 to shift from the position shown in Fig. 7 to its opposite position in which it makes contact between the contact strip 95 and the contact strip 94.

The foregoing circuit number one energizes the motor at the switch and the motor operates to move the switch from its normal to its reverse position; and just after the switch reaches its reverse position and is locked in that position, the pole-changer contact blocks 108 and 109 are shifted mechanically by the mechanism of the switch machine to interrupt the above traced circuit number one and cut off the supply of current from the battery 96 to the motor. The armature 98 of the motor, however, continues to rotate due to its acquired momentum and generates the indication current which flows along a circuit which may be traced as follows:

*Circuit number two.*

Starting at the armature 98, conductor 123, conductor 133, contact spring 106, contact block 109, contact spring 107, conductors 134 and 126, field 99 of the motor, conductor 127, contact spring 36, contact piece 34, contact spring 37, conductor 135, through the coil 20 of the protective device, conductor 136 through the indication magnet 79, conductor 137, contact strip 95, contact bar 92, contact strip 94, conductor 138, contact spring 87, contact block 85, contact spring 87, conductors 139 and 140, contact spring 104, contact block 108, contact spring 105, conductors 141 and 124, back to the other terminal of the armature of the motor.

The flow of current generated by the continued rotation of the armature of the motor through the indication magnet 79 causes said magnet to lift its armature 80 which trips the dog 76, releases the latch 75 and permits the lever 70 to be moved to its full reverse position.

The operation of moving the switch from its reverse position to its normal position is substantially the same as hereinbefore described, and the circuits for this operation may be easily traced by analogy to the circuits already traced.

*Operation of the protective device.*

With this brief description of the operation of the electric interlocking system illustrated in Fig. 7, it is possible to explain more clearly the functions performed by the protective device in preventing false or improper operation of the switch under abnormal conditions, such as caused by crosses or grounds. One assumption will serve to illustrate the action and functions of the protective device; and for a simple instance, assume that an electrical connection is falsely made between the two control wires 122 and 140, as indicated by the two crosses and dash line designated 200 in Fig. 7. This improper connection between the two control wires may be due to the breaking down of the insulation which will permit current to flow from one control wire to the other, or may be due to any other cause which will result in a conducting path being established between said two control wires.

Assuming the parts to be in their normal position shown in Fig. 7, it can be seen that the cross 200 might cause an improper operation of the switch and place the switch out of correspondence with its controlling lever. To illustrate, disregarding for the moment the action of the protective device, current may flow from the battery 96 to the motor at the switch machine and cause it to reverse the switch according to a circuit which may be traced as follows:

*Circuit number three.*

From the battery 96, conductor 117, safety magnet 81, conductors 118 and 145, indication selector magnet 91, conductor 146, contact spring 88, contact block 84, contact spring 88, conductors 147 and 140, to the point where the cross 200 exists, thence along the path of the cross to the conductor 122, thence to the contact spring 100, contact block 108, contact spring 101, conductor 123, armature 98 of the motor, conductor 124, contact spring 102, contact block 109, contact spring 103, conductors 125 and 126 to the field 99 of the motor, conductor 127, contact spring 36, contact piece 34, contact spring 39, and conductor 128 back to the battery.

From the foregoing it can be seen that unless means is provided for breaking the above traced circuit number three at some point it may happen that the motor will be operated to move the switch out of correspondence with its control lever. However, at the point in the above traced circuit number three where the control wire 140 is connected by the cross 200 to the control wire 122, current may flow not only out to the switch machine, but also back through the apparatus in the tower along a circuit which may be traced as follows:

*Circuit number four.*

From the cross 200, conductors 122 and 148, contact spring 89, contact block 85, contact spring 89, conductor 149, contact spring 93, contact bar 92, contact spring 95, conductor 137, indication magnet 79, conductor 136, coil 20 of the protective device, conductor 135, contact spring 37, contact piece 34, contact spring 39 and conductor 128 back to the battery 96.

It will be noted from the indication circuit number two traced above that the indication current flows from the common return wire 127, through the coil 20 of the protective device to the indication magnet 79 in the direction indicated by the arrow I, in Fig. 7; but the flow of current from the battery 96 according to the circuit number four last traced through the indication magnet 79 is in the opposite direction through the coil 20 of the protective device. In other words, indication currents in all cases flow through the coil 20 in one direction, whereas any improper current due to a cross, such as 200, flows through the coil 20 in the opposite direction.

Figure 2:
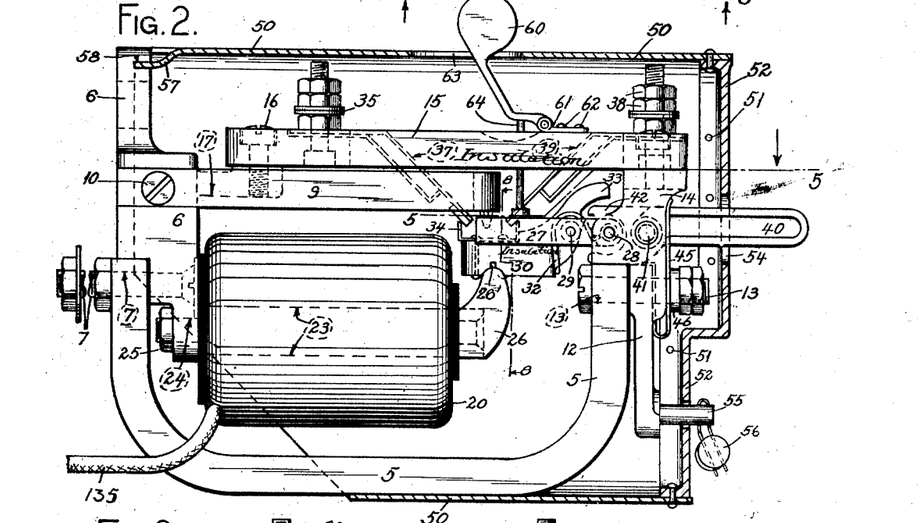
Fig. 2 is a side elevation of the protective device, the casing being shown in section.

Referring to Fig. 2, when the armature 27 is in its upper position the magnetic flux of the permanent magnet 5 passes from the front end of said magnet through the armature 27 along the soft iron extension 9, the rear supporting block 6, and back to the rear end of the permanent magnet 5; and this flux tends to hold the armature 27 in its upper position. When current flows in one direction through the coil 20 the magnetic flux induced will circle through the core 23 of said coil and the soft iron extension 9 without interfering with the armature 27; but when current flows through the coil 20 in the opposite direction, the armature 27 will be strongly attracted and pulled downwardly. The indication current flows through the coil 20 in the direction to retain the armature 27 in its upper position, whereas the improper flow of current along circuit number four through the coil 20 causes the armature to be pulled down. When the armature 27 is pulled down it engages the shoulder 31 on the contact holder 30 and also forces said contact holder down to break the electrical connection between the contact piece 34 and the contact springs 36, 37 and 39. At the time that this electrical connection is broken there is a strong magnetic field between the pole piece 26 of the coil 20 and the downwardly projecting rib 11 on the extension 9; and this field serves to blow out any arc between the contact spring 39 and either or both of the contact springs 36 and 37.

Referring to Fig. 7, it can be seen that when the contact holder 30 is moved to its lower position, the common return wire 127 is disconnected from the negative wire 128 and also from the indication wire 136; and the negative battery wire 128 is disconnected from the indication wire 136. In this way, the negative terminal of the battery is completely disconnected from the circuits of the function so that the function is fully protected against either false operation of the switch by its motor, or false indication. It should be noted that current from the local battery 96 in order to pass through the indication magnet 79 must pass through the coil 20 of the protective device or polarized relay in the wrong direction, irrespective of the way in which this current may obtain its path; and, consequently, any cross, ground or other failure on any part of the system which might result in a false indication by current supplied from the battery 96, is prevented from giving such false indication by the protective device. Instead of the cross indicated at 200, between the two operating wires of a given function, the cross may be between an operating wire of one function which carries current and the operating wire of another function; but in this case, as well as in other cases of grounds, crosses and the like, the protective device operates in the same way to protect the system fully from false operation or indication.

When the armature 27 drops, as hereinbefore described, it rests upon the residual pins of the pole piece 26 of the core 23 of the coil 20, and the magnetic flux of the permanent magnet 5 passes through said pole piece and said core, thereby holding the armature 27 in its lower position. When the armature 27 drops the indicator 60 also falls by its own weight, and makes it easy for the operator to determine the protective device which has operated.

To restore the protective device to its normal position, the operator presses downwardly on the handle 40 and the lower finger 43 engages the cross connecting portion of the armature 27 and raises said armature to its upper position, in which position it is retained by the magnetic flux of the permanent magnet 5. In bringing the lower finger 43 into contact with the armature 27 the upper finger 42 is simultaneously raised to engage the tail 33 of the contact holder 30 and to press said contact holder 30 downwardly relatively to the armature 27 against the tension of the spring 32. Consequently, when the armature 27 is restored to its upper position by a downward pressure upon the handle 40, the contact holder 30 has been moved downwardly relatively to the armature 27 so as to be out of contact with the contact springs 36, 37 and 39; and this condition will exist as long as pressure is maintained on the handle 40. When the operator releases the handle 40, the tension of the spring 32 raises the contact holder 30 to its upper or normal position, as shown in Fig. 2 and Fig. 6; but before the contact holder 30 can return to its upper position the upper finger 42 must be lowered, which means that the lower finger 43 must also be lowered to leave the armature 27 free to move downwardly. If the cross, ground or the like which caused a flow of current through the coil 20 of the protective device in the wrong direction still exists, the armature 27 will be attracted downwardly the instant the contact holder 30 reaches its upper position and establishes a conducting path between the contact springs 36, 37 and 39, thereby instantly breaking the connection between said contact springs. In short, when the circuits are opened by the protective device, these circuits cannot be again closed unless the parts of the protective device are in position to immediately re-open the circuit if necessary. In this way, the operator of the interlocking plant cannot carelessly or maliciously restore a protective device while a cross or the like exists; nor can he maliciously fasten down the handle 40 and prevent the operation of the protective device, or detract from its efficiency. The protective device may be arranged to operate so as not only to disconnect the particular function affected but also the whole interlocking plant or any section or sections thereof. Also, while the protective device has been illustrated as applied to a particular electric interlocking system, it may be used with other systems and for other purposes.

Although I have particularly described the construction of one physical embodiment of my invention, and explained the operation and principle thereof; nevertheless, I desire to have it understood that the form selected is merely illustrative, but does not exhaust the possible physical embodiments of the idea of means underlying my invention.

What I claim as new and desire to secure by Letters Patent of the United States, is:

1. In an electric interlocking system, in combination with an operating circuit, a normally closed circuit controller adapted to open said circuit; electro-magnetic means comprising a movable element for opening said circuit controller; and manually operable restoring means adapted when moved to its operated position to return said movable element to its normal position, said restoring means while in the operated position acting to keep the circuit controller open, whereby the restoring means cannot be manipulated to prevent the circuit controller being opened when required by the operation of said movable element.

2. In an electric interlocking system, in combination with an operating circuit, a normally closed circuit controller adapted to open said circuit; electro-magnetic means comprising a movable element adapted when operated from its normal position to open said circuit controller, said movable element and circuit controller after operation thereof being automatically maintained in that condition until restored; and manually operable means for returning the movable element and circuit controller to their normal positions, said restoring means acting to keep the circuit controller open while the movable element is being held in its normal position by said restoring means, whereby the circuit controller cannot be reclosed by the restoring means until the movable element is released and free to open the circuit controller again.

3. In an electric interlocking system, in combination: a circuit including a circuit controller; an armature for operating said circuit controller and having a normal position corresponding to the closed position of said circuit controller and an operated position corresponding to the open position of said circuit controller; a hand lever for restoring said armature to its normal position and for simultaneously holding said circuit controller open; and means for restoring said circuit controller to its closed position when said hand lever is released and cannot hold said armature in its normal position.

4. In an electric interlocking system, in combination: a circuit including a circuit controller; an armature operatively connected to said circuit controller, said armature having a normal position corresponding to the closed position of said circuit controller; electromagnetic means for controlling said armature; means for restoring said armature to its normal position; and means operated by said last-mentioned means for holding said circuit controller open while said last-mentioned means holds said armature in its normal position.

5. In an electric interlocking system, in combination: a circuit including a normally closed circuit controller; a coil; an armature controlled by said coil and operatively connected to said circuit controller; said armature having a normal position and an operated position, said armature being moved to its operated position to open said circuit controller by a flow of current in said coil of a predetermined character; means for restoring said armature to its normal position and for simultaneously holding said circuit controller open; and means for moving said circuit controller to its closed position in correspondence with said armature when said first-mentioned means is released and ceases to hold said armature in its normal position.

6. In an electric interlocking system, in combination: a circuit including a normally closed circuit controller; a polarized armature operatively connected to said circuit controller, said armature having a normal position corresponding to the closed position of said circuit controller and an operated position corresponding to the open position of said circuit controller; a permanent magnetic field for holding said armature in its normal position and said circuit controller closed; a coil; said coil when energized by current flowing therein in certain direction setting up a magnetic field which moves said armature to its operated position to open said circuit controller; manually operable means for restoring said armature to its normal position; and means effective while said last-mentioned means is operated for holding said circuit controller open.

7. In an electric interlocking system, in combination: a circuit including a normally closed circuit controller; an armature operatively connected to said circuit controller; said armature having a normal position corresponding to the closed position of said circuit controller, the operative connection between said armature and said circuit controller compelling said circuit controller to move to its open position when said armature is operated but permitting said circuit controller to be open while said armature is in its normal position; a spring tending to move said circuit controller to its closed position in correspondence with the normal position of said armature; electromagnetic means for controlling said armature; and a hand lever for simultaneously moving said armature to its normal position and said circuit controller to its open position.

8. In an electric interlocking system, in combination: a circuit; a permanent magnet; a pivoted polarized armature held in its normal position by said magnet; a coil, said coil when energized by a flow of current therein in a certain direction setting up a magnetic field which moves said armature to its operated position; a circuit controller pivoted to said armature and included in said circuit; a spring tending to move said circuit controller to its closed position, said circuit controller being positively opened when said armature is operated from its normal position; and a hand lever arranged to restore said armature to its normal position and to simultaneously hold open said circuit controller.

9. In an electric interlocking system, in combination: a source of current; an electrically operated function; a return connection from said function to said source of current; indication mechanism; a connection from said function to said indication mechanism; a circuit controller arranged to interrupt said return connection and held yieldingly in a normally closed position; means interposed in said indication mechanism connection and operated by a flow of current therein of a predetermined character to open said circuit controller; and manually operable restoring means operable to return said means to its normal position and adapted while active to hold said circuit controller open.

10. In an electric interlocking system, in combination: a source of current; an electrically operated function; a return connection from said function to said source of current; a circuit including said return connection which is closed when said function is at rest; a circuit controller arranged to interrupt said return connection; electromagnetic means interposed in said circuit and operated by a flow of current therein in a certain direction to open said circuit controller; means for restoring said electromagnetic means to its normal position; and means for restoring said circuit controller to its normal position when said electromagnetic means is in its normal position, said first-mentioned restoring means when operated preventing the operation of said last mentioned restoring means.

11. In an electric interlocking system, in combination: a source of current; an electrically operated function; a return connection from said function to said source of current; indication mechanism; a conducting path for current to flow from said return connection through said indication mechanism; a circuit controller arranged to interrupt said return connection and said conducting path; and means interposed in said conducting path and operated by a flow of current therein in a certain direction to open said circuit controller.

12. In an electric interlocking system, in combination: a source of current: an electrically operated function; a return connection from said function to said source of current; indication mechanism; a conducting path for current to flow from said return connection through said indication mechanism; a circuit controller for interrupting said path and said return connection; a protective device having a movable armature and interposed in said path, the armature of said protective device being operatively connected to said circuit controller and being operated by a flow of current in a certain direction in said path to open said circuit controller; manually operable means for restoring the armature of said protective device to its normal position and including means for holding said circuit controller open while said manually operable means holds said armature in its normal position.

13. In an electric interlocking system, in combination: an electrically operated function; a source of current; operating wires for said function; a manually operable circuit controller for controlling the electrical connections between said source of current and said operating wires; a return connection from said function to said source of current; indication mechanism; a conducting path for current from said return connection through said indication mechanism, and through said circuit controller to the operating wire which is disconnected from said source of current; means including a normally closed circuit controller and an armature operatively connected thereto interposed in said path and operated by the flow of current from said source along said path to disconnect said source of current from said indication mechanism and said function; and manually operable means for restoring said armature and said normally closed circuit controller to their normal positions successively.

14. In an electric interlocking system having an operating circuit, a protective device comprising a normally closed circuit controller adapted to break said circuit, electro-magnetic means including a movable element for opening said circuit controller, and manually operable restoring means for returning said movable element to its normal position, said restoring means while being operated to maintain the movable element in its normal position acting to keep the circuit controller open, whereby the restoring means cannot be improperly used to prevent the electro-magnetic device opening the circuit controller.

15. In an electric interlocking system having an operating circuit and an indication circuit including said operating circuit in part, a protective device comprising a normally closed circuit controller adapted to interrupt said operating circuit, an electro-magnetic device responsive to current of a predetermined character in the indication circuit and including a movable element adapted to open said circuit controller, said movable element after being operated remaining in that position until restored, and manually operable means for returning said movable element to its normal position, said restoring means while being actuated acting to keep the circuit controller open, whereby the restoring means cannot be manipulated to keep the circuit controller improperly closed.

16. In an electric interlocking system, the combination with an operating circuit, of a protective device therefor comprising a normally closed circuit controller adapted to interrupt said operating circuit, electro-magnetic means including a movable element and adapted when supplied with current of a predetermined character to open said circuit controller, said circuit controller after being opened automatically remaining open until reclosed, and manually operable restoring means effective only when operated and then again returned to the normal position for reclosing said circuit controller, said restoring means while in the normal position rendering said circuit controller free to be opened by said electro-magnetic means, whereby the restoring means cannot be manipulated to keep the circuit controller improperly closed.

17. In an electric interlocking system, the combination with an operating circuit, of a protective device comprising a normally closed circuit controller and operable upon current of a predetermined character to open said circuit controller, said protective device when thus operated acting to keep the circuit controller open until restored, and manually operable restoring means effective when actuated and then replaced to restore the protective device to the normal condition, said restoring means when actuated without being replaced causing the circuit controller to remain open, whereby the restoring means cannot be manipulated to keep the circuit controller closed while the protective device is in condition tending to open the circuit controller.

18. In an electric interlocking system, in combination with an operating circuit, a normally closed circuit controller adapted to open said circuit, electro-magnetic means responsive to current of a predetermined character for opening said circuit controller, said circuit controller when opened automatically remaining open until restored, and manually operable restoring means for said circuit controller, said restoring means when operated so as to reclose the circuit controller acting to place it in condition to be automatically re-opened by said electro-magnetic means, whereby the circuit controller cannot be kept closed improperly by manipulation of the restoring means.

WILLIAM S. HENRY.